J. D. Nietsche.

Coffin.

No. 3,470. Reissued Jun. 1, 1869.

Witnesses:
Chas. A. Pettit
Solon C. Kemon

Inventor:
J. D. Nietsche
per Munn & Co.
Attorneys

N. PETERS, PHOTO-LITHOGRAPHER, WASHINGTON, D. C.

United States Patent Office.

J. D. NIETSCKE, OF SOMERSET, OHIO.

*Letters Patent No.* 69,238, *dated September* 24, 1867; *reissue No.* 3,470, *dated June* 1, 1869.

IMPROVEMENT IN PRESERVING DEAD BODIES.

The Schedule referred to in these Letters Patent and making part of the same.

*To all whom it may concern:*

Be it known that I, J. D. NIETSCKE, of Somerset, in the county of Perry, and State of Ohio, have invented a new and useful Improvement in Coffins; and I do hereby declare the following to be a full, clear, and exact description of the same, reference being had to the accompanying drawings, forming a part of this specification, and in which—

Similar letters of reference indicate corresponding parts in the two figures.

Figure 1:
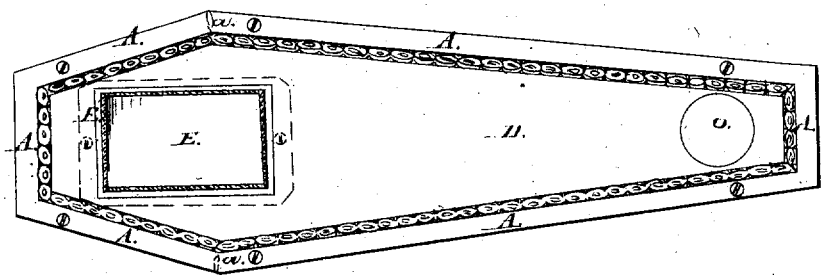
Figure 1 is a top view of my invention.

In this invention a new method of making the coffin air-tight is employed, and a new apparatus is introduced for filling the coffin with gas, or exhausting the atmospheric air within it.

In order that others skilled in the art to which my invention appertains, may be enabled to make and use the same, I will proceed to describe it in detail.

In the drawings—

A A A represent the pieces composing the walls of my improved coffin.

These pieces are bevelled, and fitted closely to each other at all the joints, except those represented by *a a*, where they are so fitted that the outer and inner edges of the pieces touch each other, leaving a vertical cavity in the centre, which is to be filled with wax, or other suitable material, in order to render the joint air-tight.

Similar material is to be placed along all the other joints, rendering them perfectly air-tight, and strips of wood B B, fitted to the position, are nailed tightly down upon the wax, confining it firmly in its place.

Around the upper edges of the coffin, strips of wood C C are first attached to the walls of the coffin, having grooves on their upper side, or being bevelled toward the coffin-walls, so as to form a groove, *c c*, after being nailed to the coffin. This groove is to be filled full of wax, or other suitable composition, for the same purpose indicated above.

These strips strengthen the coffin, and form supports for the cover, bottom, &c. The lining of the coffin may be attached to them, and the spaces between them may be padded, if desired.

The coffin being thus constructed, the lid, or cover D is screwed down tightly upon it.

On the under side of the cover is a little ridge, or elevation *d*, which, when the lid is in place, fits into the groove *c c*, and presses the wax out, so as to render the joint perfectly tight.

A glass plate, E, is fixed in the lid, over the place where face of the deceased will come, in such a manner as to be removable from above. For this purpose the glass plate may be inserted in a frame, *e*, fitted tightly to the lid in the manner above described, or the frame may have a groove along its upper edge, which can be filled with wax, and a small cover, *e'*, may be provided to fit tightly down upon it, and be secured in that position.

The under side of the plate is to have a thin film of collodion applied to it, in order to preserve its transparency.

In the coffin-lid, near the feet of the occupant, is the apparatus for filling the coffin with gas. It consists of an outer tube, G, running up through the lid, and fastened by two washers, or collars *h h'*, one above and one below the lid, which screw upon the tube, screw-threads being cut around its upper outer surface for that purpose, and an inner tube I, which fits tightly, and screws up and down in the outer tube.

A hole, *k*, is drilled through the lower wall of the outer tube, and another, *l*, through the inner tube.

The bottom of the outer tube being closed up, it follows that when the holes *k l* are brought in connection, a passage is established from the interior of the coffin to the air outside of it, by which, by means of a pump or condenser, the air in the coffin may be exhausted, or hydrogen or other gas may be pumped into it, to the exclusion of atmospheric air.

When the coffin is filled in this manner, the inner tube may be turned, so as to disconnect the apertures *k l*, and the gases will thus be effectually confined within the coffin.

For convenience in turning the inner tube, and for attaching the air-pump or condenser, notches *m m* are provided in the upper extremity of the inner tube. This apparatus is to be placed in the coffin-lid, the upper collar *h* brought to a level with the upper end of the outer tube, and the lower collar *h'* screwed firmly up against the lid.

The inner tube is then to be screwed up or down until the holes *k l* are brought into connection.

The coffin is then to be filled with gas in the manner described, and the apertures *k l* disconnected.

Figure 2:
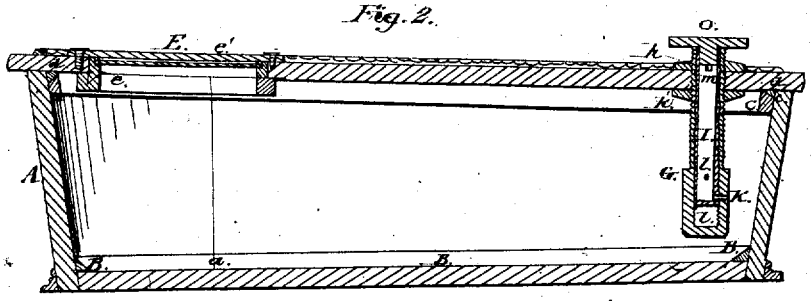
Figure 2 is a longitudinal vertical section of the same.

The inner tube is then to be screwed down to a level with the outer tube, and the cap, or button O is to be inserted in it, as shown in fig. 2, and made water and air-tight, by means of wax, or other suitable material.

The coffin is then ready for transportation or for use.

Bodies may be preserved in this manner, by using the proper gases, for an indefinite period, remaining entirely unchanged in appearance. They may be transported long distances, then taken out, moved, readjusted in position, photographed, or dressed, and restored again to their narrow tenement with the greatest ease, and without discomfort to those employed in the work.

In all cases of death from putrid or infectious diseases, this coffin will prove invaluable, as by means of it the body is completely isolated from the surrounding air, and no infection can be communicated from it.

If in any case it be not desirable to move the body, the glass plate E may be lifted, and a lock of hair taken, or a bouquet placed in the coffin.

The whole apparatus is thus peculiarly adapted to meet all the wants that have been experienced in regard to coffins, and is besides convenient to handle, and far cheaper than any other coffin which will at all effect the preservation of the body for any length of time.

The antiseptic gases used in my device may be hydrogen-gas, the vapor of alcohol, or carbolic acid, and generally all gases or vapors of an antiseptic nature; but so far as my experiments have demonstrated, the most effective means for accomplishing the desired object, is a gas generated from one part of chlorate of potash, and four parts of muriatic acid.

My object is to preserve a body by thoroughly impregnating or saturating it in an air-tight, gas-tight box without embalmment or mutilation.

What I claim as my invention, and desire to secure by Letters Patent, is—

1. The apparatus for filling the coffin with gas, consisting of the tube G, having the perforation *k*, in combination with the tube I, having the perforation *l*, and with the collars *h h'* and the cap O, substantially as and for the purposes specified.

2. Saturating defunct bodies with antiseptic gases, in an air-tight coffin, substantially as and for the purposes specified.

In testimony that I claim the above, I have hereunto subscribed my name in the presence of two witnesses.

J. D. NIETSCKE.

Witnesses:
I. W. SHIRLEY,
HENRY J. CRAIN.